Dec. 16, 1952     E. J. MARKVART     2,621,947
SWIVEL KNOB CONSTRUCTION
Filed March 11, 1948
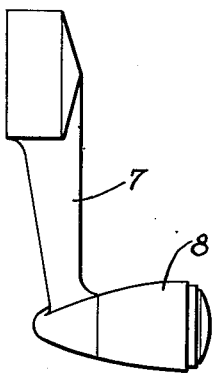
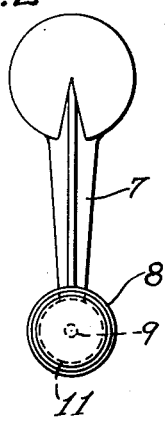
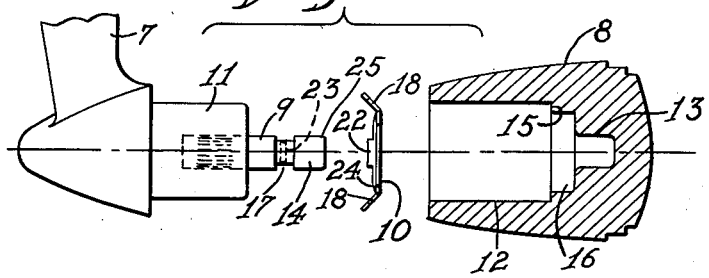
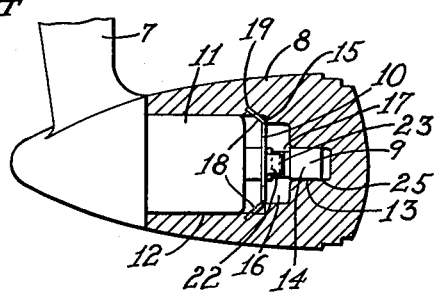
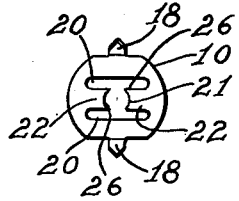
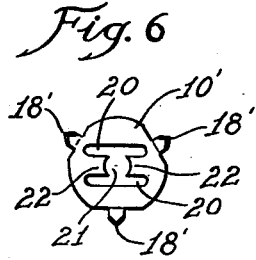
Inventor.
Edwin J. Markvart Patented Dec. 16, 1952

2,621,947

UNITED STATES PATENT OFFICE 2,621,947

SWIVEL KNOB CONSTRUCTION

Edwin J. Markvart, Rockford, Ill., assignor to Spengler-Loomis Manufacturing Co., Rockford, Ill., a corporation of Illinois Application March 11, 1948, Serial No. 14,269

4 Claims. (Cl. 287—53)

1

This invention relates to a new and improved swivel knob construction, a novel feature of which is a specially designed lock washer, adapted for use in fastening wooden or plastic knobs to cranks, as on pencil sharpeners, with freedom for the knob to turn with respect to the crank pin.

The principal object of the invention is to provide a washer, which may be punched to generally circular form from spring steel, to provide two or more circumferentially spaced inclined spur projections on the periphery, adapted to embed themselves in the softer material of the knob when the parts are assembled together, there being also two spring lugs provided on diametrically opposite sides of a center hole in the washer, which will be more or less flexed when the reduced end of the crank pin is forced through the center hole in the assembling of the parts, and which will thereafter spring back when the lugs come into register with an annular groove provided therefor in the crank pin, the two lugs being adapted to cut a groove in the annular groove in the crank pin in the first two or three turns of the knob relative to the crank pin in the turning of the crank of a pencil sharpener, so that the knob will be freely rotatable relative to the crank pin but cannot be withdrawn. The washer may be, and preferably is, dished to a slight degree, so as to give the diametrically opposed spring lugs forward inclination in the direction of inclination of the peripheral spurs, whereby to afford increased resistance to deflection of these lugs in the opposite direction in the assembling of the parts and accordingly insure a more reliable fastening in the quantity production of pencil sharpeners and the like.

The invention is illustrated in the accompanying drawing, in which:

Figs. 1 and 2 are a side and front view, respectively, of a pencil sharpener crank, the operating rotary knob of which embodies a lock washer made in accordance with my invention;

Fig. 3 is an exploded view, partly in section and partly in elevation, showing the crank pin, lock washer and knob on a larger scale;

Fig. 4 is a cross-section through the assembly on the same scale as Fig. 3;

Fig. 5 is a front view of the lock washer shown in Figs. 3 and 4, and

Fig. 6 is a front view of another lock washer of modified alternative construction.

Similar reference numerals are applied to corresponding parts throughout these views.

Referring to the drawing and, for the present,

2 mainly Figs. 3, 4, and 5, the reference numeral 7 designates the crank of a pencil sharpener, but, of course, the crank may be a part of any other manually operated device, the present invention being concerned only with improvements in the fastening of a suitable rotary knob 8 on the crank pin 9. The invention is particularly concerned with the lock washer 10 that is made from spring steel in the form of a stamping, the blank being punched, pierced, and drawn to the shape shown in Figs. 3 and 5 and subsequently hardened.

The knob 8 is preferably molded of plastic material, but may be of wood, rubber, or composition material, and even soft metal may be employed, it being important only that the knob be of softer material than the hardened spring steel washer 10. The crank pin 9 is preferably of brass, but may be of any other soft metal, it being important merely that the pin be of softer metal than the hardened spring steel washer 10. The pin 9 is an insert in the cylindrical hub or bearing portion 11 molded integral with the crank 7 that is made of plastic material. The blind bore 12 in the knob 8 has an easy working fit on the hub or bearing portion 11 when the knob 8 is in assembled relation to the crank 7. The reduced inner end 13 of the bore 12 receives the pilot end portion 14 of the crank pin with a similar easy working fit, so that the knob 8 has ample bearing support on the crank 7 on opposite sides of the lock washer 10 in the assembled position of the latter. The lock washer 10, as will soon appear, is fixed in the bore 12 in abutment with the annular shoulder 15 defined where the inner end 16 of the bore is slightly reduced, and it is arranged to turn freely with respect to the pin 9 in the annular groove 17 provided in said pin behind the pilot end portion 14.

The lock washer 10 is of generally circular form, and has two diametrically opposed pointed spurs 18 provided thereon, both inclined in the same direction relative to the plane of the washer at an angle of approximately 45°. The washer is slightly smaller in diameter than the bore 12 in the knob 8, and the spurs 18 have their pointed ends on a diameter sufficiently in excess of the diameter of the bore 12 to insure having these spurs embed themselves in the softer material of the knob when the washer is thrust home in the bore 12, as indicated at 19 in Fig. 4, the shoulder 15 serving to limit the inward movement of the washer in the bore. Parallel slots 20 are punched in the washer 10 on opposite sides of a circular center hole 21, whereby to define two spring lugs 22 on diametrically opposite sides of the center hole. The diameter of the center hole 21 is slightly smaller than the diameter of the crank pin 9 in the annularly grooved portion 17, so that when the washer 10 is forced over the pilot end portion 14 of the crank pin and the lugs 22 are received in the grooved portion 17 of the pin, they will bite into the pin and cut an annular groove for themselves, as indicated in dotted lines at 23 in Fig. 3, when the washer 10 is given a few turns with the knob 8 relative to the pin 9. The washer 10 is dished slightly in the direction of inclination of the spurs 18, as indicated at 24 in Fig. 3, with a view to increasing the resistance to deflection of the lugs 22 in the opposite direction, when the washer is forced over the pilot end portion 14 of the crank pin 9. The outer end of the pilot portion 14 is rounded, as indicated at 25, to facilitate the assembling operation by holding the washer 10 in exact concentric relation to the crank pin 9 while the knob 8 is being pressed onto the washer. Of course, as soon as the hub 11 enters the outer end of the bore 12, it serves as a pilot for the knob, so that the washer 10 will be certain of assembly in concentric relation to the knob. As the knob is pressed onto the washer, the washer is forced over the crank pin 9 and the lugs 22, which, as indicated in Fig. 3, are inclined forwardly, are deflected rearwardly and finally snapped into the groove 17, and, then, when the knob is turned a few times, the sharp corners 26 on the lugs 22 serve as cutting tools to cut an annular groove 23 in the grooved portion 17 of the pin, whereby to locate the knob 8 at a predetermined position endwise with respect to the pin and prevent endwise displacement of the knob from the pin.

As shown at 10' in Fig. 6, the washer may have three spurs 18' 120° apart on the same radius as the spurs 18 and inclined forwardly at a 45° angle, in the same way as the spurs 18, whereby to center the washer more accurately in the bore 12 of the knob 8 and at the same time give better anchorage by the embedding of three spurs in the softer material of the knob as compared with the embedding of only two spurs. The washer 10' is otherwise of the same construction as the washer 10 and is arranged to cooperate with the knob 8 and pin 9 in the same way.

It should be clear from the foregoing description that the lock washers of my invention enable quick and easy assembling of the knob on the crank, and with minimum expense, and with maximum assurance that the knob will not work loose and slip off. Everything connected with the fastening means is completely concealed for neat and attractive appearance.

While I have described the invention as applied to handles for the cranks of pencil sharpeners it will be understood that it is applicable to the fastening of handles and the like rotatably to any cylindrical arbor and the like.

It is believed the foregoing description conveys a good understanding of the objects and advantages of my invention. The appended claims have been drawn to cover all legitimate modifications and adaptations.

I claim:

1. In a swivel knob construction of the character described comprising two telescoping relatively rotatable members, the outer member having a blind axial bore of appreciable length and diameter provided therein opening from the one end thereof and terminating in an appreciably reduced concentric inner end portion of relatively small length, the inner end of the bore next to the reduced end portion being slightly reduced to define an annular locating shoulder, the inner member having a cylindrical bearing portion of appreciable diameter fitting freely and rotatably in said bore in spaced relation to said locating shoulder, and a reduced concentric pin portion fitting freely and rotatably in the reduced terminal end portion of the bore, the pin portion having an annular groove provided therein intermediate the ends thereof, the improvement which consists in the provision of a spring lock washer of generally circular form slightly smaller in diameter than the outer portion of the bore in the outer member but large enough in diameter to have abutment with the annular locating shoulder therein, and having peripherally projecting pointed lugs bent in inclined relation to the plane of the washer and gripping the walls of said bore to resist rotation of the washer relative to the bore, the washer having a central opening provided therein and having on diametrically opposite sides of said opening two flexible lugs, the inner ends of which are struck on concentric arcs of a circle concentric with the washer and smaller in diameter than the annularly grooved pin portion of the inner member, in which the ends of said lugs are adapted to cut a lug-retaining annular groove when the washer is disposed in abutment with the locating shoulder in the outer member and is turned relative to the pin portion while the outer member is assembled in telescoping relation to the inner member, the corners at the inner ends of said diametrically opposed lugs being sharply pointed and serving as cutting edges.

2. A swivel knob construction as set forth in claim 1, wherein the spring lock washer is dished in the direction of inclination of the peripherally projecting pointed lugs so as to increase the resistance to deflection of the diametrically opposed central lugs in the opposite direction and accordingly increase the spring pressure exerted by said lugs in cutting a lug-retaining groove in the annularly grooved portion of the pin portion of the inner member.

3. In a swivel knob construction of the character described comprising two telescoping relatively rotatable members, the outer member having a blind axial bore of appreciable length and diameter provided therein opening from the one end thereof and terminating in an appreciably reduced concentric inner end portion of relatively small length, the inner end of the bore next to the reduced end portion being slightly reduced to define an annular locating shoulder, the inner member having a cylindrical bearing portion of appreciable diameter fitting freely and rotatably in said bore in spaced relation to said locating shoulder, and a reduced concentric pin portion fitting freely and rotatably in the reduced terminal end portion of the bore, the improvement which consists in the provision of a spring lock washer of generally circular form slightly smaller in diameter than the outer portion of the bore in the outer member but large enough in diameter to have abutment with the annular locating shoulder therein, and having peripherally projecting pointed lugs bent in inclined relation to the plane of the washer and gripping the walls of said bore to resist rotation of the washer relative to the bore, the washer having a central opening provided therein and having on diametrically opposite sides of said opening two flexible lugs, the inner ends of which are struck on concentric arcs of a circle concentric with the washer and smaller in diameter than the pin portion of the inner member, in which the ends of said lugs are adapted to cut a lug-retaining annular groove when the washer is disposed in abutment with the locating shoulder in the outer member and is turned relative to the pin portion while the outer member is assembled in telescoping relation to the inner member, the corners at the inner ends of said diametrically opposed lugs being sharply pointed and serving as cutting edges.

4. A swivel knob construction as set forth in claim 3, wherein the spring lock washer is dished in the direction of inclination of the peripherally projecting pointed lugs so as to increase the resistance to deflection of the diametrically opposed central lugs in the opposite direction and accordingly increase the spring pressure exerted by said lugs in cutting a lug-retaining groove in the pin portion of the inner member.

EDWIN J. MARKVART.

REFERENCES CITED

The following references are of record in the file of this patent:

UNITED STATES PATENTS

| Number | Name | Date |
|---|---|---|
| 1,547,628 | Tinnerman | July 28, 1925 |
| 1,626,671 | Enberg | May 3, 1927 |
| 1,911,916 | Menamin | May 30, 1933 |
| 1,928,469 | Tinnerman | Sept. 26, 1933 |
| 1,976,198 | Steenrod | Oct. 9, 1934 |
| 2,191,780 | Tinnerman | Feb. 27, 1940 |
| 2,234,097 | Tinnerman | Mar. 4, 1941 |
| 2,266,049 | Kost | Dec. 16, 1941 |
| 2,345,768 | Nelson | Apr. 4, 1944 |
| 2,398,374 | Hartman | Apr. 16, 1946 |
| 2,435,079 | Hotchkin | Jan. 27, 1948 |

FOREIGN PATENTS

| Number | Country | Date |
|---|---|---|
| 17,771 | Great Britain | of 1904 |